(12) United States Patent
Gray et al.

(10) Patent No.: US 9,141,355 B1
(45) Date of Patent: Sep. 22, 2015

(54) RECEIVING AND EVALUATING GENERALIZED INPUT

(75) Inventors: Theodore W. Gray, Champaign, IL (US); Christopher Carlson, Urbana, IL (US)

(73) Assignee: WOLFRAM RESEARCH, INC., Champaign, IL (US)

( * ) Notice: Subject to any disclaimer, the term of this patent is extended or adjusted under 35 U.S.C. 154(b) by 2102 days.

(21) Appl. No.: 11/737,098

(22) Filed: Apr. 18, 2007

(51) Int. Cl.
*G06F 9/45* (2006.01)
(52) U.S. Cl.
CPC ...................................... *G06F 8/427* (2013.01)
(58) Field of Classification Search
USPC .......................................................... 717/143
See application file for complete search history.

(56) References Cited

U.S. PATENT DOCUMENTS

| | | | | |
|---|---|---|---|---|
| 5,544,262 A | * | 8/1996 | Pagallo | 382/189 |
| 5,913,221 A | * | 6/1999 | Kano et al. | 715/224 |
| 7,464,373 B1 | * | 12/2008 | Yunt et al. | 717/125 |
| 7,747,981 B2 | * | 6/2010 | Gray | 717/108 |
| 7,765,529 B1 | * | 7/2010 | Singh et al. | 717/134 |
| 8,046,202 B1 | * | 10/2011 | Yang et al. | 703/6 |
| 2008/0189718 A1 | * | 8/2008 | Gulley et al. | 718/107 |

\* cited by examiner

*Primary Examiner* — Hang Pan
(74) *Attorney, Agent, or Firm* — Workman Nydegger

(57) ABSTRACT

Generalized input for use in a computing environment. The generalized input can include freely mixed input types. The generalized input is received via a user interface. Each expression can include multiple types of input that can be processed as peers, without translation from one input type to another input type prior to parsing. The generalized input can include textual, numerical, graphical, and symbolic input as part an expression. The input can also include programs, scripts, methods, procedures, and the like or any combination thereof.

19 Claims, 4 Drawing Sheets

RECEIVING AND EVALUATING GENERALIZED INPUT

CROSS-REFERENCE TO RELATED APPLICATIONS

Not Applicable.

BACKGROUND OF THE INVENTION

1. The Field of the Invention

The present invention relates to generalized input in computing systems. More particularly, embodiments of the invention relate to generalized input including freely mixed graphical, symbolic, textual and/or numeric input.

2. The Relevant Technology

Software allows users to take advantage of the increasing power of computers for any number of applications. User interfaces often allow users to interact with the software running on the computer by allowing a user to view a representation of input as it is entered for use by the software as well as permitting the user to view a representation of the output on the computer. This is often true in both the use of a computer program as well as in the writing and development of the program and in other uses of a computer.

In order to input commands and/or data for processing, text (such as ASCII characters) is usually entered into the computer. The text is then parsed and compiled into instructions. The instructions are used to build internal data structures that the computer uses to execute the desired commands. The results are then processed as desired and returned as output. The output is interpreted by a graphical user interface and displayed to the user in a chosen format.

Inputting data in conventional system is often limited to the use of textual and numerical elements. For example, conventional programming languages are usually written using text. Programmers are required to express all variables, input, and the like using text such as ASCII characters. These types of programming languages or other input systems cannot function with different types of mixed input. Using a graphic in a text based system likely results in an error or is not understood and cannot be processed. Generally stated, input is typically limited to a class of input such as ASCII characters and many computers or programs are unable to accept a more generalized input that includes freely mixed input types.

The subject matter claimed herein is not limited to implementations that solve any disadvantages or that operate only in environments such as those described above. Rather, this background is only provided to illustrate one exemplary technology area where some implementations described herein may be practiced.

BRIEF SUMMARY OF THE INVENTION

These and other limitations are overcome by embodiments of the invention, which relate to systems and methods for generalized input in a computing environment. Generalized input may include textual, numerical, graphical, and/or symbolic input as part of the input or expression. In addition, the various types of input can be freely mixed together to form any type of expression. After the generalized input is received, the generalized input is typically parsed directly to form a binary representation of the generalized input. Advantageously, the generalized input does not need to be converted to the conventional textual representation and then processed. Rather, embodiments of the invention enable the use of generalized input. In some embodiments, no form of input is any more fundamental than another form of input, in contrast to conventional systems. However, a user can receive many different advantages from the ability to mix input types.

Expressions (such as functions, mathematical formula, equations, procedures, commands, etc.) that are composed via a user interface and that include generalized input can be processed in context. Further, the ability to mix different types of input can extends to evaluation of an expression even in situations where such evaluation may not have a traditional understanding. Nonetheless, this enables additional applications, programming options, and other advantages to a user.

For example, if a particular part of the input cannot be reduced or perhaps does not satisfy conventional standards for evaluation, embodiments of the invention continue to process or evaluate the input as possible. For example, a conventional polynomial expansion can be typically input as $(1+x)^2$. In this example, the "x" is typically required to be an ASCII character. Any other type of input cannot be evaluated, parsed, or even accepted. In contrast, embodiments of generalized input allow for any type of input to be used in a expression such as a polynomial expansion. For instance, the "x" in the polynomial expansion could be replaced with an image (not an ASCII character) of an "x", or with an executable program or an executing program as a variable. This type of mixed input cannot be processed using conventional systems. Advantageously, embodiments of the invention enable this type of generalized input to be processed in context. Thus, the expanded polynomial includes instances of the executable program or of the generalized input in the various terms. Embodiments of the invention extend to and are able to evaluate, simplify, expand, reduce or otherwise process the generalized input to the extent possible. Embodiments further enable the use of input in situations where conventional systems may provide an error or be unable to process the generalized input.

This Summary is provided to introduce a selection of concepts in a simplified form that are further described in the Detailed Description section below. This Summary is not intended to be used as an aid in determining the scope of the claimed subject matter. Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
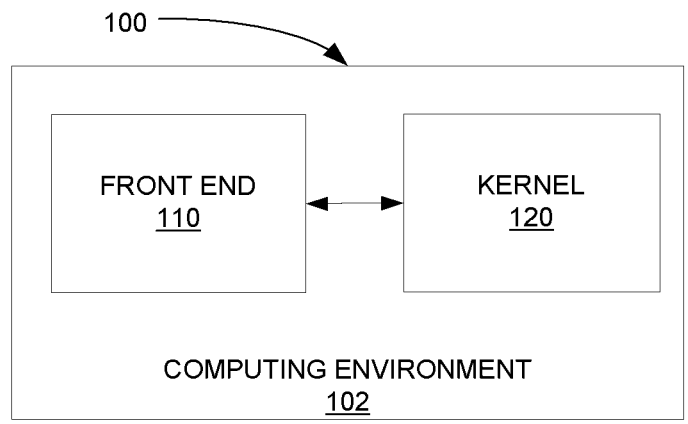
FIG. 1 illustrates a system for receiving and evaluating generalized input in all types of generalized input are parsed and evaluated as peers according to one example.

Embodiments of the invention relate to generalized input in a computing system. Generalized input is a transformation of conventional input mechanisms. Whereas conventional input mechanisms are often limited to ASCII or alphanumeric input, embodiments of the invention provide the ability to freely mix multiple types of input, which provides significant advantages over conventional systems. For instance, the user interface becomes more intuitive and easier to understand. Users can compose expressions or user input in a variable manner with mixed input types and are no longer limited to conventional representations of input. The ability to use, for example, graphical objects as input instead of lengthy text inputs simplifies the generation of the input.

Embodiments of the invention can be implemented in a wide range of varying applications. Computational software (such as Mathematica), web design, programming languages, web tools, development kits, and the like are examples of systems that benefit from the use of generalized input.

Generalized input can include, but is not limited to, textual input, graphical input, numerical input, and symbolic input, and the like or any combination thereof. More specific examples of input that can be mixed and presented as generalized input include ASCII text, other text standards such as greek symbols, programs, scripts, controls, graphics, objects including control objects, symbols and any combination thereof. Generalized input enables different types of input to be mixed freely, in contrast to the constraints of conventional systems. Embodiments of the invention not only include generalized input for use in computing systems but also relate to receiving and evaluating generalized input.

One aspect of generalized input relates to the ability to recognize and handle the generalized input. In one sense, the generalized input enables an arbitrary representation of the input. The ability to parse and convert arbitrary representations expands the ability of a user to compose the input. In addition, a user can begin to compose generalized input in a more intuitive manner that enables another user to quickly grasp the intent of the generalized input. For example, the ability of a programmer to set a background color often relies on a textual representation of the color in conventional systems. The textual representation often includes an inherent identification of the color space as well as a list of numbers that are mapped to a color space. The ability to visually recognize the color that will be displayed from a list of numbers is minimal. In fact, it is likely that the user will be required to compile and evaluate the expression before the user has a visual understanding of the selected color.

In contrast, generalized input enables a user to perform a similar or the same function using a color swatch or a color object. The color that is set with a control object is immediately apparent to the user without the need to compile the program and view the resulting output. Further, a control object enables a user to quickly change the color and view what the color will be without having to evaluate the expression. Both the control object and the textual representation of a background color are valid. Further, one is not more fundamental that the other from the perspective of the evaluating program in one embodiment. Rather both input types can be parsed and represented as a binary form in a computing environment. In fact, the binary representation may be identical in many instances depending on the expression. One of skill in the art can appreciate that the examples included herein are intended to be an example of the advantages afforded by generalized input and are not intended to limit the scope of the invention. With the benefit of the present disclosure, however, the advantages and uses of generalized input in a wide variety of uses and contexts will be apparent.

FIG. 1 illustrates a computing environment 100 that includes a system 102. The system may include software that can operate in the computing environment 100. The system 102 also represents one embodiment of a computing system that enables the use and interpretation of generalized input. The computing environment 100 may include, by way of example only, a stand alone computer, a network based system (LAN, WAN, Internet, etc.), a peer to peer system, or other computing configuration. Embodiments of the invention can be embodied or configured for use in a computer application (such a program, application, development tool, etc.) that can operate as a stand alone application, a client-server based application, a web based application and the like or any combination thereof In the example illustrated in FIG. 1, the system 102 may include a front end 110 and a kernel 120. A single front end 110 and kernel 120 are illustrated. However, multiple front ends and/or multiple kernels may also be used. Further, the front end 110 and the kernel 120 are not required to operate on the same computer, but can be distributed over a network. Further, the division of processing responsibilities can be allocated between the front end 110 and the kernel 120 in different manners.

The front end 110 is typically configured to allow interaction with users. The front end 110 processes the input received from users and transmits the input to the kernel 120. For example, one implementation the front end 110 is configured to receive multiple types of input, which may generally include any combination of functions, control objects and/or objects that may be parsed (referred to hereinafter as parse-able objects). The designation of which objects are control objects and which objects are parse-able objects can be arbitrary and may be selected and modified as desired as discussed in more detail below.

The front end 110 is configured to receive generalized input. The user interface presented by the front end 110 may have an existing library of input including control objects. The front end 110 may also be able to import other objects, data, images, scripts, programs, etc., that can be included in the generalized input. The front end 110, for example, can identify the type of object imported and treat it accordingly. For example, if the imported object is an image file, the front end 110 may determine the type of image file, which enables the system 102 to treat the imported object in context. Additionally, the front end 110 is configured to cause a user interface to display a representation of the input. The front end 110 also allows the user to interact with the representations, such as by allowing for editing functionality as well as other interaction as desired. The front end 110 also enables a user to interact with the generalized input while generating an expression. In addition, the generalized input can therefore be manipulated before evaluation of the expression. In some instances, the input is dynamically modifiable. Further, the output of the evaluated expression can also be manipulated, including dynamically manipulated, according to the type of input.

For example, consider a program that is designed to display bouncing balls. The balls can be started or stopped individually. When the program is included in an expression or other form of user input, the system 102 can treat the program in context. For example, the expression may simply be to execute the program. In this case, the program is executed. Alternatively, the expression may be a polynomial (i.e. (1+program)^2) where the program is included as a variable instead of the conventional "x". Once the expression is evaluated, the expanded polynomial may include multiple instances of the program (i.e. (1+2*program+program^2)). Thus, the program is evaluated as possible and in context. In each case, a user can manipulate the output or individual instances of the program included in the output as well as manipulate the program included in the input. This illustrates the ability to freely mix the types of input or is an example of generalized input.

Returning to FIG. 1, the kernel 120 receives the input from the front end 110. Some of the input or expression may include functions that are to be performed on objects associated with the function. The kernel 120 processes the input in order to parse the input into binary representations of the input and may form data structures within the system. More particularly, the kernel 120 parses both the functions and the associated objects into their binary representations. The kernel 120 then performs computations with the data structures, such as by applying algorithms corresponding to designated functions on the associated objects.

The kernel 120 may also be configured to receive information from other interfaces. For ease of reference, the kernel 120 has been described as parsing the input to create internal data structures. The data structures may be parsed in any manner and at any location by any software module, such as by the front end 110 or elsewhere.

The data structures represent the expression or user input received from the front end 110. The data structures resulting from processing the user input may include pointers for one or more location in memory for the elements within the user input. The user input or expression may include, in addition to the types of input described above, functions, expressions, tables, and the like.

The kernel 120 may also be configured to access a database that includes any number of functions or processes designated by the user input. The user input representing each function may be arbitrarily designated. For example, objects representing functions may include commonly recognized designations such as textual representations, graphical representations, or other representations or any combination thereof.

For example, the user input or expression may represent a function for determining the square root of another object arbitrarily represented by the symbol α (greek symbol alpha). The user input may be input textually as "SQRT [alpha]", graphically as the symbol $\sqrt{\alpha}$, or by some other arbitrary representation. Accordingly, any object may be associated with any function. In addition, any function may be associated with alpha. Similarly, any function may be configured to operate on any object or objects. The objects may be designated by any representation, as previously noted. If the input includes a function, the kernel 120 performs the function on the associated objects. The kernel can evaluate the input and provide output as applicable or in context.

A function that is included in generalized input or in an expression may operate on multiple types of objects. These object types include, without limitation, control objects and parse-able objects. The function typically operates on the objects regardless of whether the objects are control objects or parse-able objects. The output of the function may depend on the type of the object, as is described in more detail below.

Control objects may generally be described as objects that may be used to provide some type of interaction with other objects. If designated as a control object, the object may be generally inert such that the function treats the object as a generalized variable that is returned as a combination of the function and the generally unchanged control object.

In the previously presented example of a square root function, if the symbol α is designated as a control object, when the kernel 120 applies the square root function to the symbol α the result would include a representation of the square root function associated with the unchanged symbol α.

On the other hand, if the object on which the function is applied is designated as a parse-able object, the parse-able object will have some characteristic or structure on which the function will use to process the parse-able object to return a result in which the parse-able object will have been processed. In particular, the function will apply associated algorithms to selected aspects of the object. Continuing with the example of the square root function, the symbol may be any type of data. If alpha represents a number within the system that has a value that may be determined using the square root function, such as the number four, the result is returned. In this case, if the symbol α has an assigned value of four and the function applied is the square root function, some representation of the number two would be returned to the front end 110.

The output of the evaluation expression (including any objects or functions included or associated therewith) is then returned to the front end 110. The front end 110 organizes the output, determines how to display the output, and causes the output to be displayed. The representation displayed by the front end 110 may also be arbitrarily selected as desired. In the case of the returned result of the number two, a common textual numerical representation of the number two, or "2", may be returned.

Alternatively, another arbitrary representation may be displayed. The selection of which objects are designated as control objects and which objects are not is arbitrary and may be designated in any desired manner. As will be discussed in more detail below, such a configuration allows for other types of elements to be used in addition to numerical and textual elements.

Figure 2:
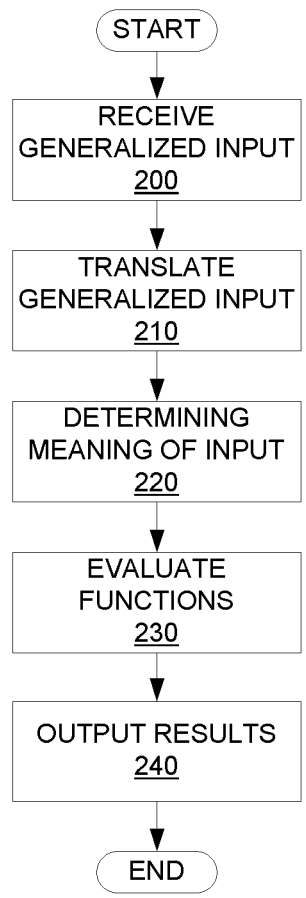
FIG. 2 is a flowchart illustrating one embodiment of a method for receiving and evaluating generalized input in which each type of generalized input is parsed and evaluated as peers according to one example.

FIG. 2 is a flowchart illustrating one embodiment of a method in a computing environment of processing integrated symbolic, textual, and/or graphical elements. The method begins at 200 by receiving input. The input may be received in any suitable manner. In one example, the input may be entered from a user interface. The user interface may include one or more input devices, including without limitation, a keyboard, joystick, controller, mouse or other type of input device. Further, the input can be generated, included, and/or accessed from any source and/or input device as well. Existing libraries, import functionality, web repositories, websites and the like are examples of sources for generalized input.

A front end may receive and process the input to a desired degree. Receiving and processing the input may include outputting a representation of the input received by the front end on an output device. For example, the front end may cause a graphical representation of the input received to be graphically displayed on an output device such as a monitor. The input may be input as desired, including editing and changing the output as desired.

The graphical representations of the input includes multiple data types. These data types include, without limitation, numerical, textual, symbolic, and graphical input as well as combinations of these data types. Accordingly, input may be generalized to include any arbitrary representation of data. Any combination of these data types may be used to form data structures. These data structures include, without limitation, functions as well as objects on which the functions are performed.

Once the desired output has been entered, the user may then cause the system to evaluate the input or the composed expression. One exemplary evaluation process will now be discussed in more detail. The evaluation process begins at 210 by translating the input into a format suitable for processing in the system. Translating the input object may include parsing the input into a binary representation. In one embodiment, there is no requirement of first translating a particular type of input into another type of input such that the entire expression is formed as a single type of input. For example, the input of $\sqrt{\alpha}$ is not required to be converted to SQRT[alpha] before being parsed. Similarly, the input of SQRT($\alpha$) is not necessarily converted to SQRT[alpha] before being parsed. Rather, embodiments of the invention can simply process the generalized input like it does other input. Thus generalized input enables different types of input to be fundamental input types.

Each and every data type may be parsed as peers. In other words, symbolic input, graphical input, textual input, and other input is typically parsed directly into a binary representation of the input. There is no requirement of translating a graphical input to its text equivalent and then processing or parsing the text equivalent. As such, in one implementation, graphical, symbolic, and other non-textual and non-numeric data is parsed in the same manner as textual and numerical input. Accordingly, the parsing of all data types may be done directly without intermediate parsing, such was often performed in previous parsing operations in which a symbolic input was first translated into a textual input.

Once the input has been parsed, at 220 the system then determines the meaning of the input, if any, within the system. For example, some of the input may be recognized as functions that are to be performed on designated objects within the input. Such combinations may include mathematical or other operations to be performed on the associated object or objects.

Any function may be associated with any other input, including numerical, textual, symbolic, and/or graphical input as well as other functions or control objects. In addition to determining whether the input contains known functions, the system also analyzes the input to determine what meaning other input has to the system. This may include determining whether the input depends on other functions or expressions defined elsewhere.

Once the system has parsed the input, at 230 the system then evaluates the functions with the input designated as being associated with the function. The system is configured to evaluate objects associated with the function that include both control objects as well as parse-able objects to a desired degree. In particular, in the case of control objects, it may be desirable that the control object pass through the evaluation process relatively unchanged, such that the control object is relatively inert.

As previously discussed, one example of a control object may include a graphical object. While graphical input may be designated either a control object or a parse-able object to represent any type of internal data structure or other type of data or structure, if the graphical object is a control object, the result of the evaluation within the system may be a serialization of the graphical object associated in someway with the function.

To further illustrate this point, the square root function may again be referenced with a graphical object. One illustrative example of a graphical object used in conjunction with the square root function may include a graphical representation of a sine wave. If the graphical representation is a control object, a serialized output may be returned in which the sine wave is returned unchanged with a square root function applied thereto. Such a representation would be analogous to the symbol $\alpha$ previously discussed as a control object, since when a function is applied to each, each are returned relatively unchanged and coupled to a representation of the corresponding function. As a result, any input type may be associated with any function.

The input type may also be dependent on other objects of factors. For example, the graphical representation of the sine wave introduced may be a representation that changes dynamically with time, such as is the case with a rolling sine way. In such an example, the output of evaluated function would also change with time, as the output would be a representation of the object coupled to the function.

If the object associated with the function is a parse-able object, the system will then determine which, if any, of the characteristics associated with the object to use in evaluating the function. In the case of many numerical objects, evaluation of the function may be straightforward. However, any number of characteristics may be designated for use in evaluating the function. For example, in the case of the rolling sine way, the value of sine at any number of points may be selected and used in the evaluation of the function. Such a result would be a dynamically varying numerical value. However, numerical values are provided merely for ease of reference.

Accordingly, the method provides for the evaluation of both control objects as well as parse-able objects that represent any type of data and may be received as any type of input, such as symbolic, graphical, textual, and/or numerical input as well as expressions—any of which may be dynamic or static. Once the input has been evaluated, at 240 the values are output for display to the user. In one implementation, the system returns a binary representation of the output to a front end, which then serializes the output and prepares the output for display. The front end may be configured to apply additional rules or logic to the output such that the output may also be displayed using any number of the data types discussed above.

FIGS. 3-8 illustrate examples of generalized input. These Figures are intended to be representative of generalized input and in no way limit or constrain the scope of the invention. FIGS. 3-8 further illustrate embodiments of the invention that can provide input that is freely mixed and includes multiple types. With the benefit of the present disclosure, one of skill in the art can appreciate that generalized input is a transformation of conventional methods and enhances the ease of providing input via user interfaces.

Figure 3:
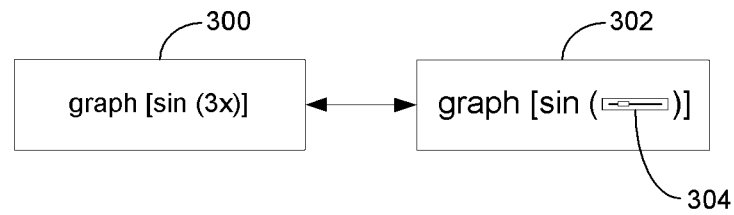
FIG. 3 illustrates one embodiment of freely mixed generalized input.

FIG. 3, for example, illustrates an example of input that can be represented in at least two different ways. The box 300 is a text representation of a function that graphs or plots the sine function. The expression or input in the box 300 is provided as text. In contrast, the box 302 illustrates different input types for the same function. However, the input in the box 302 includes both text and graphics. More specifically, the sine function includes a graphical object 304, which is slider in this example. A slider can represent, by way of example only, a range of values that can be changed simply by moving the slider. In this example, the slider is presumed to represent a range of integers. Another advantage of generalized input is that the expression can be altered by simply moving the slider compared to entering new text.

However, embodiments of the invention contemplate generalized input such that the slider may represent or correspond to a range of colors. In this case, the sine of a color may simply return the same object rather than a graph or a value. However, the system accepted the input and parsed and processed the input in context and provided the result to the extend that the object could be evaluated.

In this example, the slider object 304 represents a range of numbers and in particular happens to be set to the value "3". The slider object 304 can have internal properties than enable it to be converted to a binary representation just like the "3" in the box 300. Thus, the kernel, for example, interprets the slider 304 and the ASCII value of 3 in a similar manner without converting from one form to the other. As illustrated above, the slider graphic or control provides advantages not available to conventional systems. In addition, the slider object also provides the ability to change the input by moving the slider, thereby changing the output when the expression is evaluated.

Figure 4:
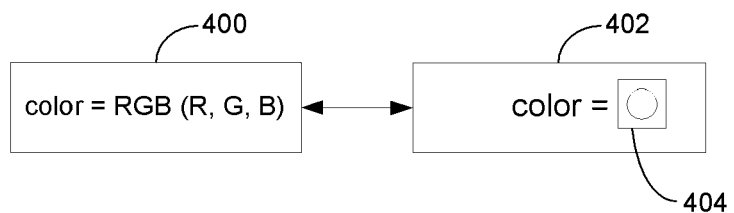
FIG. 4 illustrates another embodiment of freely mixed generalized input.

FIG. 4 illustrates another example of generalized input. In this case, the expression in the box 400 includes a function that is intended to select and apply a particular color. This color may be applied, by way of example, to a background, to text, or to another object. The expression in the box 400 requires the user to provide three separate values (a red value, a green value, and a blue value). In contrast, the expression in the box 402, which freely mixes text and graphic objects, achieves the same result using a graphical object 402.

The object 402 is a color object in this example. By selecting the object 404 (such as by clicking) a user can quickly select a different color. This contrasts with the function 400 which requires the user to type in new values. Advantageously, use of the object 404 provides the benefit of having a visual indication of the actual color, which is visually displayed in the color object 404. In fact, the object 404, when activated, may present a palette to the user such that a color can be selected. This enables the user to have a good idea of what color has been selected before the expression is actually evaluated. The color object can be used to achieve the same result as the expression 400, but provides a user interface that can be more intuitive and more easily understood.

Figure 5:
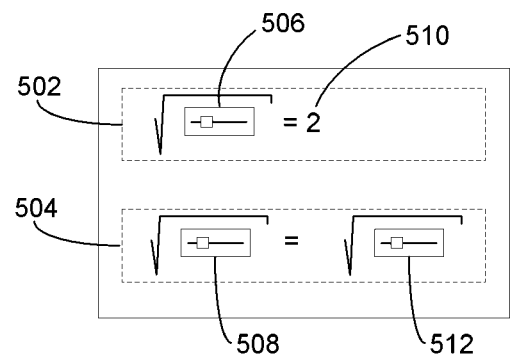
FIG. 5 illustrates differences between types of objects included in generalized input.

Objects, such as the objects 304 and 402, also have other properties that can impact how they are evaluated. For example, the slider object 304 or the color object 404 can be control objects or set to some value. FIG. 5 illustrates this distinction. For example, the object 506 and the object 508 are each slider objects that can be set to different values (often to a range of values).

However, the object 508 may be a control object for a range of colors while the object 506 may be set to an integer value. Thus, the evaluation of the function 502 returns the value 2 (510) while the evaluation of the function 504 returns an unchanged result 512, which is the square root of a color object. In this example, evaluating the expression 504 returns the identical expression when evaluated in context. In other words, the output includes at least a portion of or is identical to the generalized input. For example, the expression 502 represents a number, so evaluating the square root of a number in context suggests returning a number result. In the context of the expression 504 where the object 508 does not represent a number, but represents a range of colors, for example, then the output is identical to the input because of the context. The square root of a color is the square root of a color. In other words, further reduction or evaluation may not be possible. One of skill in the art can envision input that may be fully reducible or partially reducible according to context.

Figure 6:
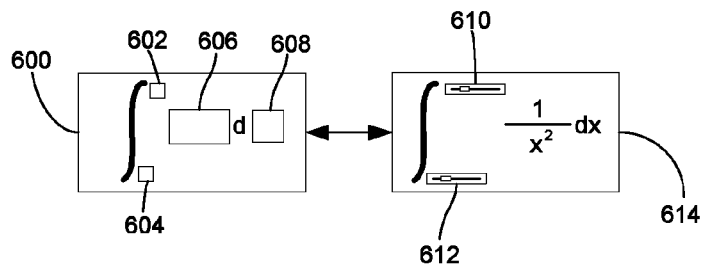
FIG. 6 illustrates another embodiment of mixed input types in an expression.

FIG. 6 illustrates another example of generalized input the expression 600 illustrates an integral where the endpoints 602 and 604 are text fields. The integrand 606 and variable of integration 608 are also text fields in this example. To change the expression or integration range of the expression may require the user to enter new endpoints in the form of text. This can require access to the underlying code and consume time while manually setting new endpoints via text entry. In contrast, the use of endpoints 610 and 612 enables a user to more quickly change the integration range. The user is not required to enter new text but can slide the sliders to a new range. This can result in a dynamic update of the output and permits quicker changes. Thus, the use of general input provides several advantages, including time savings.

Figure 7:
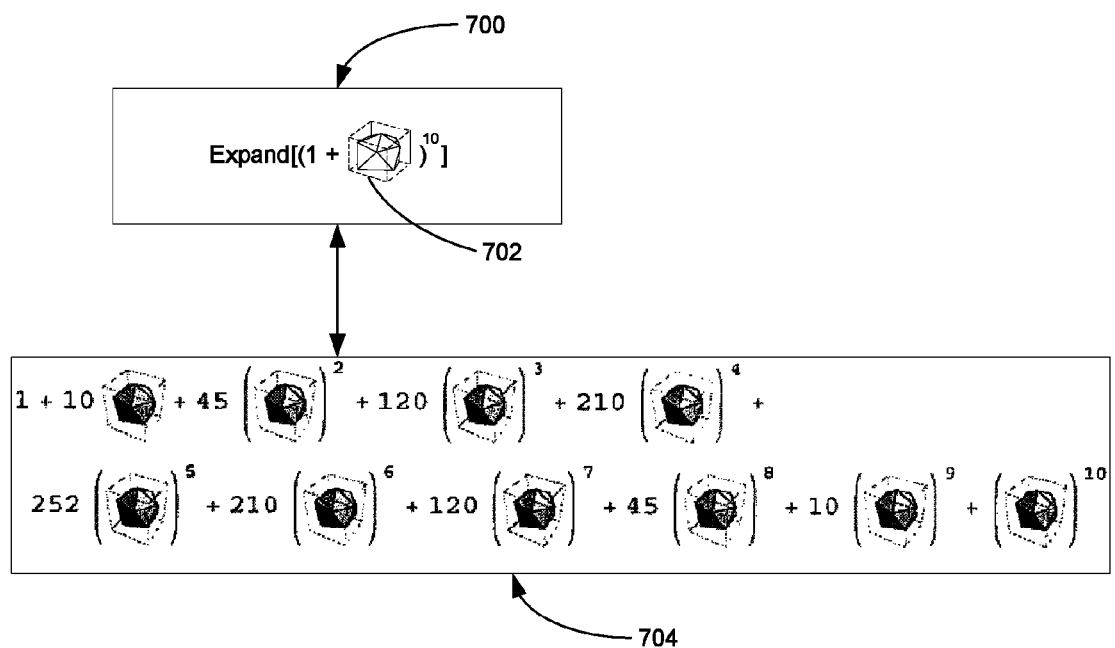
FIG. 7 illustrates another embodiment of mixed input types in an expression.

FIG. 7 illustrates another embodiment of generalized input. In this example, an expansion of the function 700 is illustrated. In this example, however, the conventional "x" variable is replaced with an image of a polygon 702. The polygon may be an image, in this example of generalized input. However, the polygon 702 can be treated in context. The resulting expansion 704 includes terms with the polygon.

Parsing such an expression can be done in context as well. For instance, the parser may recognize that the expression is a pair of terms that are collectively raised to a power. The parser may also recognize the command expand in the expression (expand((1+image)$^n$). When the parser encounters the image, it may recognize it as an image and then treat it in the context of what it already knows about the expression. As a result, the expression is expanded as illustrated in FIG. 7.

Figure 8:
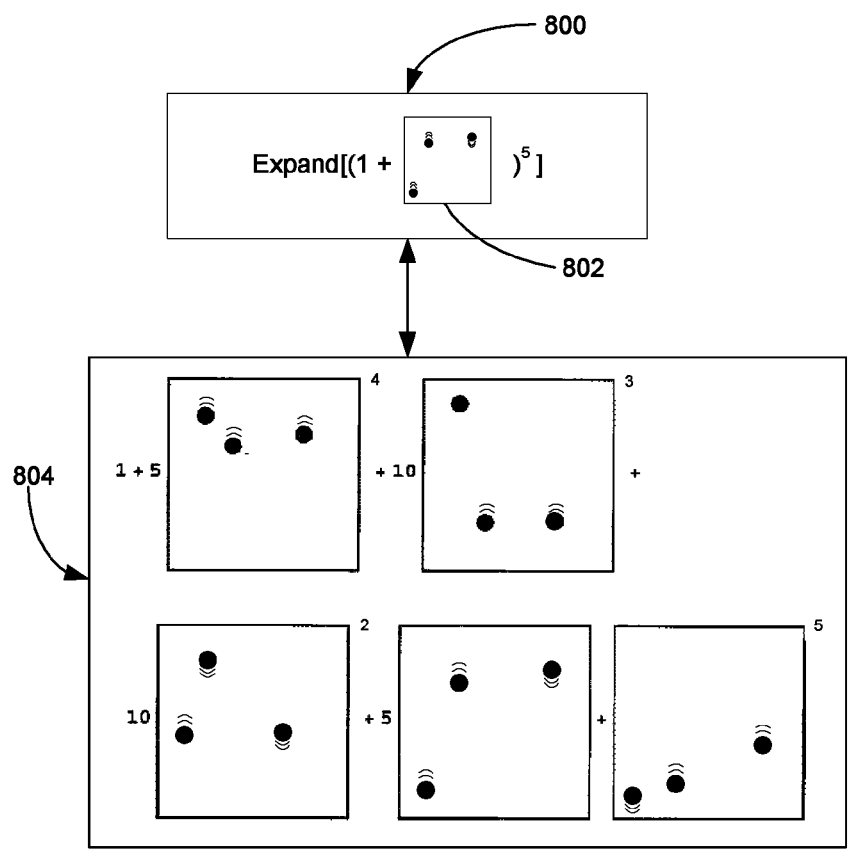
FIG. 8 illustrates another embodiment of mixed input types.

FIG. 8 illustrates another embodiment of generalized input that is similar to FIG. 7. In this example, the expression includes a program 802 (the program is a group of bouncing balls that obey a rule in this example). The program can be executing or executable and is treated in the context of the expression. As a result, the evaluated expression includes a series of terms and the program 802 is included in some of those terms of the output 804. The program 802 in the input and/or the output can be commenced or stopped. Further, the program in each term can be started and/or stopped, independently of other terms. Nonetheless, the initial input expression can still be evaluated using this type of generalized input.

One of skill in the art, with the benefit of the present disclosure, can contemplate a wide variety of different input types as well as different input combinations. Nesting expressions can be made graphically by simply putting one graphic inside another. Algebraic functions, geometric functions, algorithms, and the like are examples of instances where generalized input can be used.

Figure 9:
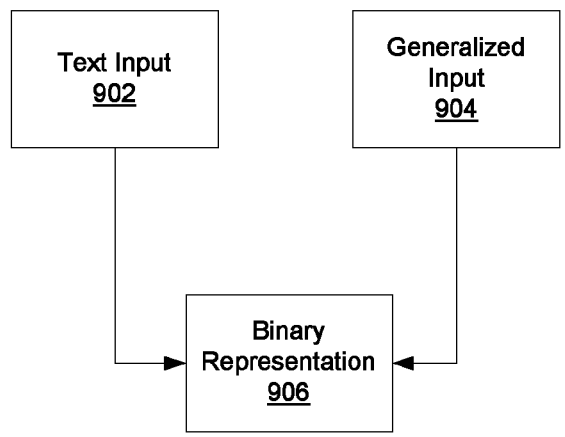
FIG. 9 illustrates an example of how generalized input is interpreted by embodiments of the invention.

FIG. 9 illustrates another example of an aspect of generalized input in accordance with embodiments of the invention. More particularly, FIG. 9 illustrates that text input 902 can be parsed and directly converted to a binary representation 906. Similarly, the generalized input 904 is also parsed and converted to a binary representation 906. Advantageously, the generalized input is not converted to another form such as the text 902 before being parsed and converted to a binary representation 906 that can be executed by a computer. In addition, the generalized input 902 and 904 represent the same expression.

Thus, embodiments of the present invention therefore enable the mixing of content free without restrictions of what type of input can be mixed. Further, embodiments of the invention integrate objects or representations that are not conventionally thought of as input.

Embodiments herein may comprise a special purpose or general-purpose computer including various computer hardware, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM, or other optical disk storage, magnetic disk storage or other magnetic storage devices, or any other medium that can be used to carry or store desired program code means in the form of computer-executable instructions or data structures, and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data that cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be implemented in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a computing environment, a method for processing input that includes different types, the method comprising:
receiving generalized input from a user interface, the generalized input including one or more of textual input and numerical input, and one or more of graphical input and symbolic input, wherein the textual input, numerical input, graphical input, and/or symbolic input can be mixed in the generalized input;
displaying the generalized input on a display in a graphical form without converting any of the generalized input to another type of input; and
parsing the generalized input directly to form a binary representation of the generalized input to identify at least one function and at least one object associated with the function, wherein the at least one object includes a symbol,
wherein the one or more of the textual input and the numerical input and the one or more of the graphical input and the symbolic input are parsed as peers,
wherein parsing the generalized input as peers further includes parsing the generalized input without converting one type of the generalized input to another type of the generalized input and while recognizing all of the generalized input as valid input.

2. The method of claim 1, further comprising evaluating the function with at least one object to provide an output.

3. The method of claim 2, further comprising serializing the output and organizing the output for display on a graphical output device.

4. The method of claim 2, wherein at least one object is selected from a group including an arbitrarily designated control object and an arbitrarily designated parse-able object.

5. The method of claim 1, wherein the generalized input is received from a front end and processed by a kernel, wherein the front end and the kernel operate as one of a stand alone application, a web based application, peer to peer application, or a server client application.

6. In a computing environment, a method for processing input received from a user that includes different types, the method comprising:
receiving generalized input from a user via a user interface, the generalized input including mixed types of input including a graphical type input, the generalized input including a first input having a first type and a second input having a second type different from the first type;
parsing the generalized input directly to form a binary representation of the generalized input to identify at least one function and at least one object associated with the function, wherein the at least one object includes a symbol,
displaying the generalized input in a graphical form on a display without converting any of the generalized input to another type of input;
evaluating the generalized input by parsing the generalized input as received via the user interface, wherein different types of input included in the generalized input are evaluated without converting one type of the generalized input to another type of the generalized input, wherein the second input is evaluated in the context of the first input;
generating output based on the evaluation of the parsed generalized input; and
displaying the output to the user.

7. The method of claim 6, wherein receiving generalized input from a user further comprises receiving input types that include one or more of text, graphics, objects, programs, images, scripts, methods, procedures, control objects, or any combination thereof as the generalized input.

8. The method of claim 7, further comprising processing each input type as a peer with other input types.

9. The method of claim 6, wherein evaluating the generalized input further comprises generating instructions for execution.

10. The method of claim 9, wherein the instructions include steps for serializing a result from evaluating the expressions and for outputting the results in a selected format to a graphical display device.

11. The method of claim 9, wherein the instructions include steps for evaluating control objects and for evaluating parse-able objects as peers with the associated expression.

12. The method of claim 6, further comprising:
dynamically adjusting the generalized input; and
dynamically adjusting the output.

13. The method of claim 6, wherein receiving generalized input further comprises:
selecting objects from a library of objects;

importing objects from a remote source; and
receiving input from an input device.

14. The method of claim 6, wherein the output is identical to at least a portion of the generalized input when evaluated in context.

15. The method of claim 6, further wherein receiving generalized input further comprises mixing the input types in a single expression that is evaluated and reduced according to context of the generalized input.

16. A system configured to receive input that includes multiple types, the system comprising:
   an input device configured to receive input that includes generalized input;
   a graphical output device, wherein the generalized input received from or collected by the input device is displayed on the graphical output device graphically without converting any of the generalized input to another type of input;
   a front end configured to receive the generalized input from the user interface, and
   a kernel for parsing the different input types included in the generalized input as peers directly to form a binary representation of the generalized input to identify at least one function and at least one object associated with the function, wherein the at least one object includes a dynamic variable, wherein the types of generalized input includes a mix of one or more of graphical and symbolic input and one or more of numerical and textual input, wherein parsing the generalized input as peers includes parsing the generalized input without converting one type of the generalized input to another type of the generalized input, wherein a first portion of the generalized input is evaluated in a context of a second portion of the generalized input.

17. The system of claim 16, wherein the kernel is further configured to identify functions in the generalized input and objects associated with the functions, and to evaluate the functions using the associated objects.

18. The system of claim 17, wherein the objects associated with the functions include control objects and parse-able objects and the kernel is configured to evaluate parse-able and control objects as peers using the associated functions.

19. The system of claim 16, wherein the front end is further configured to serialize a result of evaluating the functions and to display the output in a graphical format on a graphical output device.

\* \* \* \* \*